United States Patent
Lin et al.

(10) Patent No.: US 9,025,346 B2
(45) Date of Patent: May 5, 2015

(54) FLY-BACK POWER CONVERTING APPARATUS

(75) Inventors: Pao-Chuan Lin, Hsinchu County (TW); Su-Yuan Lin, Hsinchu County (TW); Hung-Che Chou, Hsinchu County (TW)

(73) Assignee: Excelliance MOS Corporation, Hsinchu County (TW)

( * ) Notice: Subject to any disclaimer, the term of this patent is extended or adjusted under 35 U.S.C. 154(b) by 177 days.

(21) Appl. No.: 13/610,874

(22) Filed: Sep. 12, 2012

(65) Prior Publication Data

US 2014/0071718 A1    Mar. 13, 2014

(51) Int. Cl.
*H02M 7/00* (2006.01)
*H02M 3/335* (2006.01)
*H02M 1/32* (2007.01)

(52) U.S. Cl.
CPC ............ *H02M 1/32* (2013.01); *H02M 3/33523* (2013.01)

(58) Field of Classification Search
USPC ........................................... 363/21.12–21.18
See application file for complete search history.

(56) References Cited

U.S. PATENT DOCUMENTS

| | | | |
|---|---|---|---|
| 4,975,820 A * | 12/1990 | Szepesi | 363/21.17 |
| 5,867,379 A * | 2/1999 | Maksimovic et al. | 363/89 |
| 6,515,874 B2 * | 2/2003 | Feldtkeller | 363/21.01 |
| 6,674,656 B1 | 1/2004 | Yang et al. | |
| 6,721,192 B1 * | 4/2004 | Yang et al. | 363/21.18 |
| 7,759,922 B2 * | 7/2010 | Baurle et al. | 323/284 |
| 2007/0247879 A1 * | 10/2007 | Yang | 363/49 |
| 2010/0124080 A1 * | 5/2010 | Yeh et al. | 363/21.12 |
| 2010/0321956 A1 * | 12/2010 | Yeh | 363/16 |

* cited by examiner

*Primary Examiner* — Adolf Berhane
*Assistant Examiner* — Gary Nash
(74) *Attorney, Agent, or Firm* — Jianq Chyun IP Office

(57) ABSTRACT

A structure of a fly-back power converting apparatus is disclosed. The structure includes a power transistor, a current detector, a pulse width modulation (PWM) signal generator and a current limiter. The power transistor is coupled to an input voltage and receives a PWM signal. The current detector detects a current output from the power transistor and generates a detecting voltage according to the current. The PWM signal generator generates the PWM signal according to a comparing result by comparing the detecting voltage and a standard voltage. The current limiter generates the standard voltage according to a turn-on time of the power transistor.

13 Claims, 5 Drawing Sheets

FLY-BACK POWER CONVERTING APPARATUS

BACKGROUND

1. Technical Field

The invention relates to a fly-back power converting apparatus. Particularly, the invention relates to a fly-back power converting apparatus capable of stably output ting power.

2. Related Art

In a conventional fly-back power converting apparatus, a control mechanism is set for a current generated on a power transistor, so as to prevent a phenomenon of over current.

In the conventional fly-back power converting apparatus, a detecting voltage is generated according to a magnitude of the current on the power transistor, and the detecting voltage is compared with a predetermined standard voltage. The standard voltage is generated according to a threshold value, and the threshold value is set according to a maximum current allowed to be generated by the power transistor. Referring to FIG. 1, FIG. 1 is a waveform diagram of the detecting voltage of the conventional fly-back power converting apparatus. According to FIG. 1, it is known that when a detecting voltage VCS generated according to the magnitude of the current on the power transistor is not less than a standard voltage VCL, the fly-back power converting apparatus activates a current limiting mechanism. However, due to a delay effect caused by internal circuit of the fly-back power conversion apparatus, the current limiting mechanism is activated after the detecting voltage VCS is not less than the standard voltage VCL for a delay time td. Now, the detecting voltage VCS exceeds the standard voltage VCL by an offset voltage dV. In other words, the current on the power transistor exceeds the maximum current that is allowed to be generated.

SUMMARY

The invention is directed to a fly-back power converting apparatus, in which possibility of excessive output power is effectively reduced when a current limiting phenomenon is generated.

The invention provides a fly-back power converting apparatus, which is operated in a discontinuous conduction mode (DCM) or a boundary conduction mode (BCM), and includes a power transistor, a current detector, a pulse width modulation (PWM) signal generator and a current limiter. The power transistor has a first terminal, a second terminal and a control terminal, where the first terminal thereof is coupled to an input voltage, and the control terminal thereof receives a PWM signal. The current detector is coupled in series between the second terminal of the power transistor and a reference ground voltage. The current detector detects a current output from the second terminal of the power transistor and generates a detecting voltage according to the current. The PWM signal generator is coupled to the current detector and the power transistor, and generates the PWM signal according to a comparing result by comparing the detecting voltage and a standard voltage. The current limiter is coupled to the PWM signal generator, and generates the standard voltage according to a turn-on time of the power transistor.

According to the above descriptions, the current limiter is used in the fly-back power converting apparatus to provide a standard voltage varied according to the turn-on time of the power transistor. In this way, the standard voltage compared by the fly-back power converting apparatus which increases along with time, such as that a phenomenon of excessive output current caused by circuit delay of the fly-back power converting apparatus may be effectively mitigated, and the output power of the fly-back power converting apparatus is effectively stabilized.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
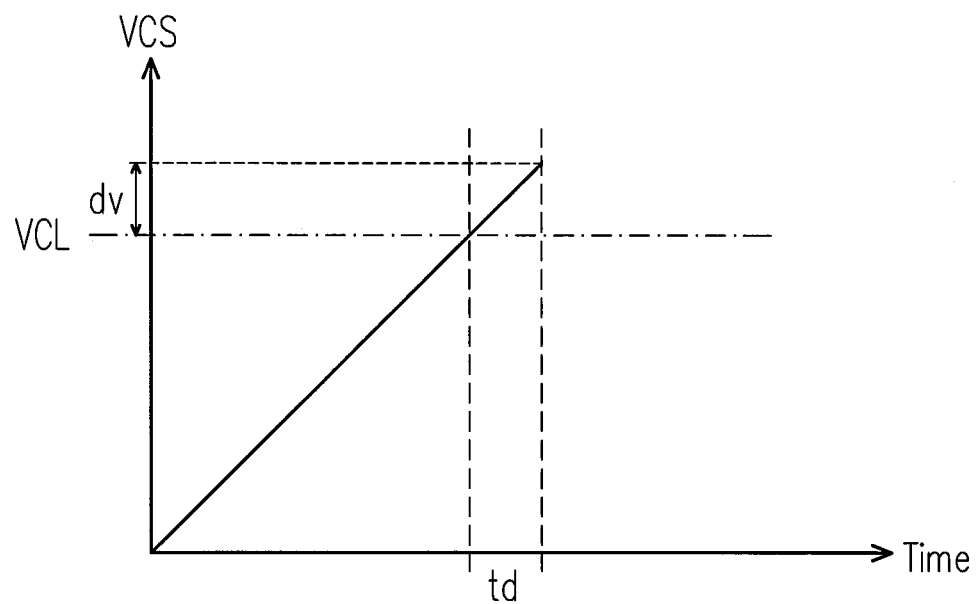
FIG. 1 is a waveform diagram of a detecting voltage of a conventional fly-back power converting apparatus.
Figure 2A:
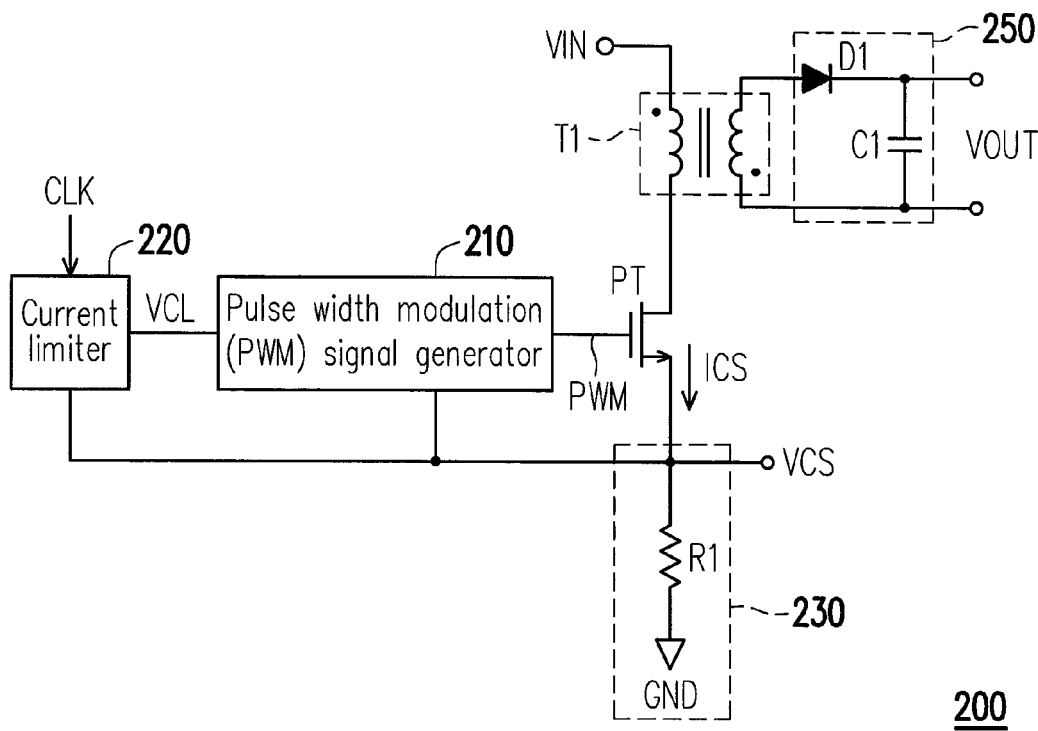
FIG. 2A is a schematic diagram of a fly-back power converting apparatus 200 according to an embodiment of the invention.

Referring to FIG. 2A, FIG. 2A is a schematic diagram of a fly-back power converting apparatus 200 according to an embodiment of the invention. The fly-back power converting apparatus 200 includes a transformer T1, a power transistor PT, a pulse width modulation (PWM) signal generator 210, a current limiter 220, a current detector 230 and a rectifier 250. The power transistor PT has a first terminal, a second terminal and a control terminal, where the first terminal thereof is coupled to an input voltage VIN through the transformer T1, and the control terminal thereof is coupled to the PWM signal generator 210 for receiving a PWM signal PWM. The current detector 230 is coupled in series between the second terminal of the power transistor PT and a reference ground voltage GND. In the present embodiment, the current detector 230 is a resistor R1, and the resistor R1 is coupled in series between the power transistor PT and the reference ground voltage GND. The current detector 230 detects a current ICS output from the second terminal of the power transistor PT and generates a detecting voltage VCS according to a magnitude of the current ICS.

The PWM signal generator 210 is coupled to the current detector 230 and the power transistor PT. The PWM signal generator 210 generates the PWM signal PWM according to a comparing result by comparing the detecting voltage VCS and a standard voltage VCL, where the standard voltage VCL is generated by the current limiter 220, and the current limiter 220 is coupled to the PWM signal generator 210 and the current detector 230. The current limiter 220 generates the standard voltage VCL according to a turn-on time of the fly-back power converting apparatus 200. Namely, the standard voltage VCL generated by the current limiter 220 is varied along with the turn-on time of the power transistor PT.

Figure 2B:
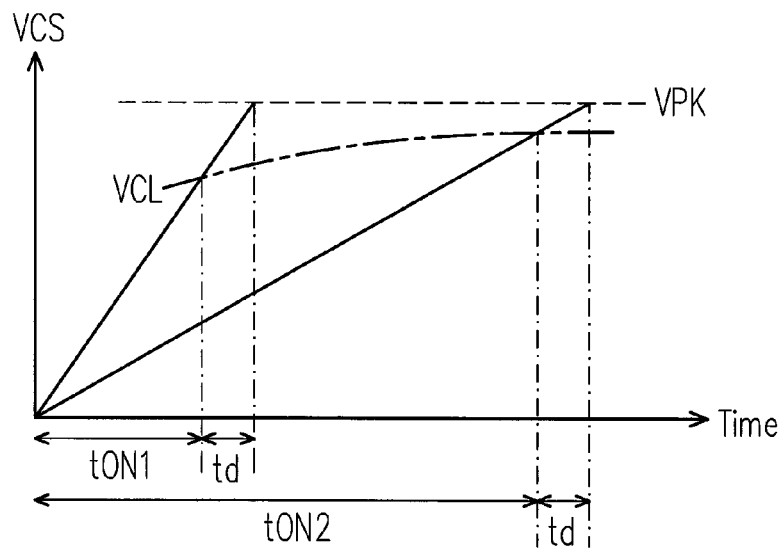
FIG. 2B is a relationship diagram of a standard voltage VCL and a turn-on time.

In the present embodiment, the current limiter 220 increases a voltage value of the provided standard voltage VCL as the turn-on time increases. Referring to FIG. 2B, FIG. 2B is a relationship diagram of the standard voltage VCL and the turn-on time. In an initial stage when the fly-back power converting apparatus 200 is activated (the turn-on time is equal to a time tON1), the current limiter 220 provides the standard voltage VCL with a smaller value to the PWM signal generator 210. As the turn-on time increases, when the turn-on time is equal to a time tON2, the current limiter 220 increases the voltage value of the standard voltage VCL for providing to the PWM signal generator 210. According to FIG. 2B, it is known that when the turn-on time is equal to the time tON1, the detecting voltage VCS starts to exceed the standard voltage VCL, and after a delay time td, when the detecting voltage VCS almost equals to a threshold value VPK, the power transistor PT is effectively turned off to effectively limit the current ICS under a safety value.

Moreover, when the turn-on time is equal to the time tON2, the detecting voltage VCS starts to exceed the standard voltage VCL, and after the delay time td, when the detecting voltage VCS almost equals to the threshold value VPK, the power transistor PT is effectively turned off to effectively limit the current ICS under the safety value.

It should be noticed that the threshold value VPK is a predetermined fixed value.

In the present embodiment, the standard voltage VCL can be obtained through calculation according to the threshold value VPK, the turn-on time and the delay time td. Referring to FIG. 2A, according to the circuit structure of FIG. 2A, in the fly-back power converting apparatus 200 of a discontinuous conduction mode (DCM) and a boundary conduction mode (BCM), the detecting voltage VCS can be represented by a following mathematic equation (1):

$$VCS = ICS * R1 = \frac{VIN}{L} * t * R1 \qquad (1)$$

Where, L is an inductance of a first side winding of the transformer T1, and t is the turn-on time.

Moreover, the threshold value VPK can be represented by a following mathematic equation (2):

$$VPK = \frac{VIN * (t + td)}{L} * R1 \qquad (2)$$

Where, t is the turn-on time, and the threshold value VPK is equal to a multiplication of a maximum current of the power transistor and a value of the resistor R1.

When over current limitation is occurred, according to the mathematic equations (1) and (2), and the detecting voltage VCS is equal to the standard voltage VCL, a following mathematic equation (3) is deduced:

$$VCL = VPK * \frac{t}{t + td} \qquad (3)$$

The current limiter 220 can generate the standard voltage VCL according to the turn-on time t according to the mathematic equation (3).

Figure 2C:
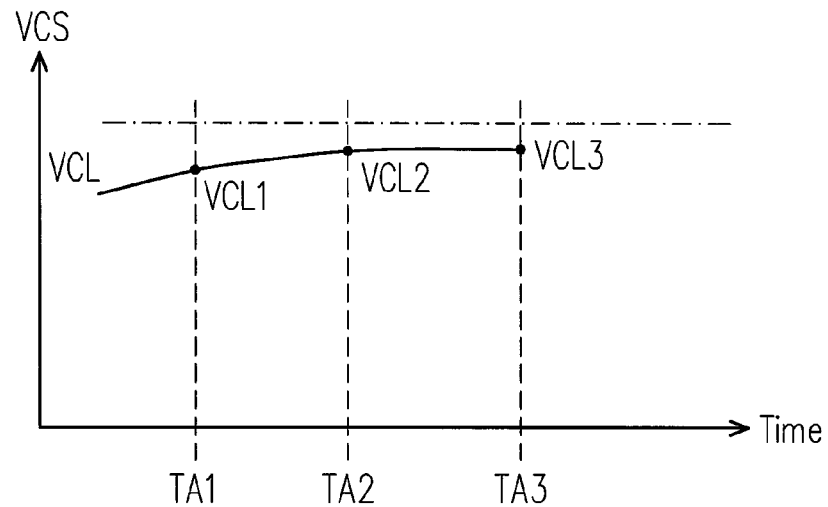
FIG. 2C is a relationship diagram of a standard voltage VCL and a turn-on time according to another embodiment of the invention.

Referring to FIG. 2C, FIG. 2C is a relationship diagram of the standard voltage VCL and the turn-on time according to another embodiment of the invention. The current limiter 220 is unnecessary to provide the standard voltage VCL that is continuously varied along with the turn-on time, but provides the standard voltage VCL with segmental linear variation. In detail, the current limiter 220 can set a plurality of time points TA1-TA3, and respectively calculates standard voltage VCL1-VCL3 corresponding to the time points TA1-TA3 according to the aforementioned mathematic equation (3). And the standard voltages VCL1-VCL3 are connected to establish a segmental linear curve of the standard voltage VCL.

The current limiter 220 finds the turn-on time and two adjacent time points in the time points TA1-TA3 adjacent to the turn-on time, and calculates the standard voltage VCL through, for example, interpolation according to the adjacent time points TA1-TA3, the standard voltages VCL1-VCL3 corresponding to the adjacent time points TA1-TA3 and the turn-on time.

Referring to FIG. 2A, the first side winding of the transformer T1 is coupled to a path of the power transistor PT used for receiving the input voltage VIN, and a second side winding of the transformer T1 is used to generate an output voltage VOUT. The rectifier 250 includes a diode D1 and a capacitor C1. An anode of the diode D1 is coupled to the second side winding of the transformer T1. A first terminal of the capacitor C1 is coupled to a cathode of the diode D1, and a second terminal of the capacitor C1 is coupled to the reference ground voltage GND.

Figure 3:
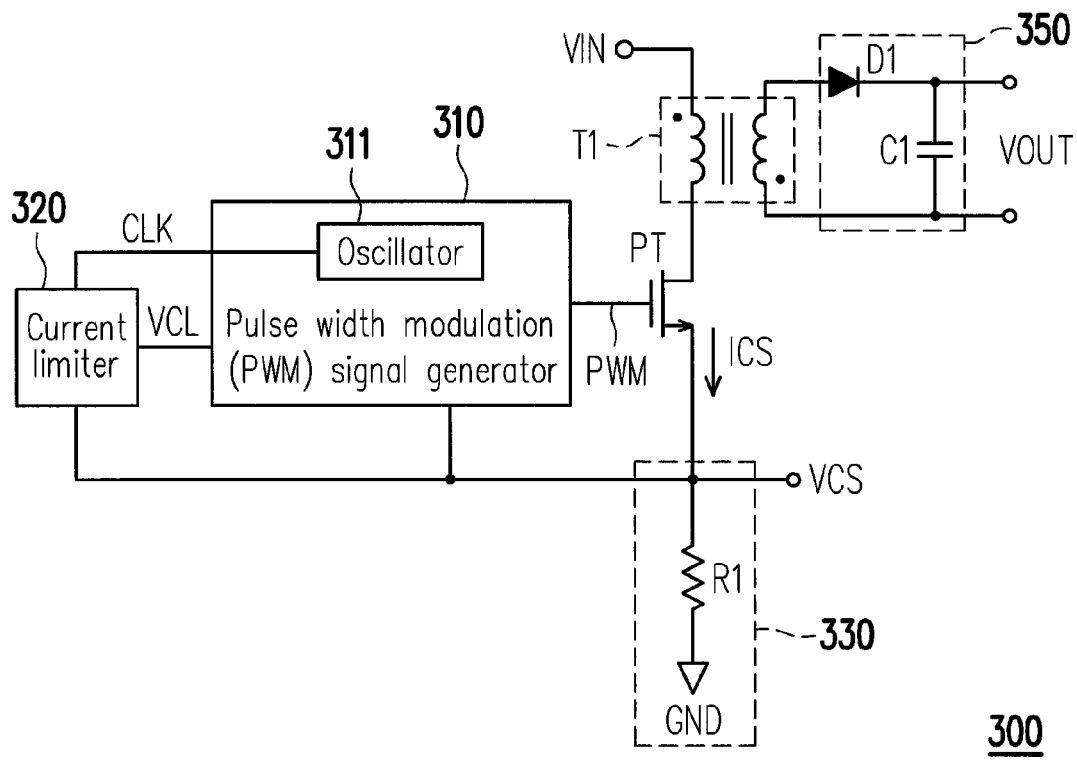
FIG. 3 is a schematic diagram of a fly-back power converting apparatus 300 according to another embodiment of the invention.

Referring to FIG. 3, FIG. 3 is a schematic diagram of a fly-back power converting apparatus 300 according to another embodiment of the invention. The fly-back power converting apparatus 300 includes a transformer T1, a power transistor PT, a PWM signal generator 310, a current limiter 320, a current detector 330 and a rectifier 350. A clock signal CLK received by the current limiter 320 is provided by an oscillator 311 built in the PWM signal generator 310. It should be noticed that the clock signal CLK provided by the oscillator 311 also serves as a basis for generating the PWM signal PWM of the PWM signal generator 310.

Figure 4A:
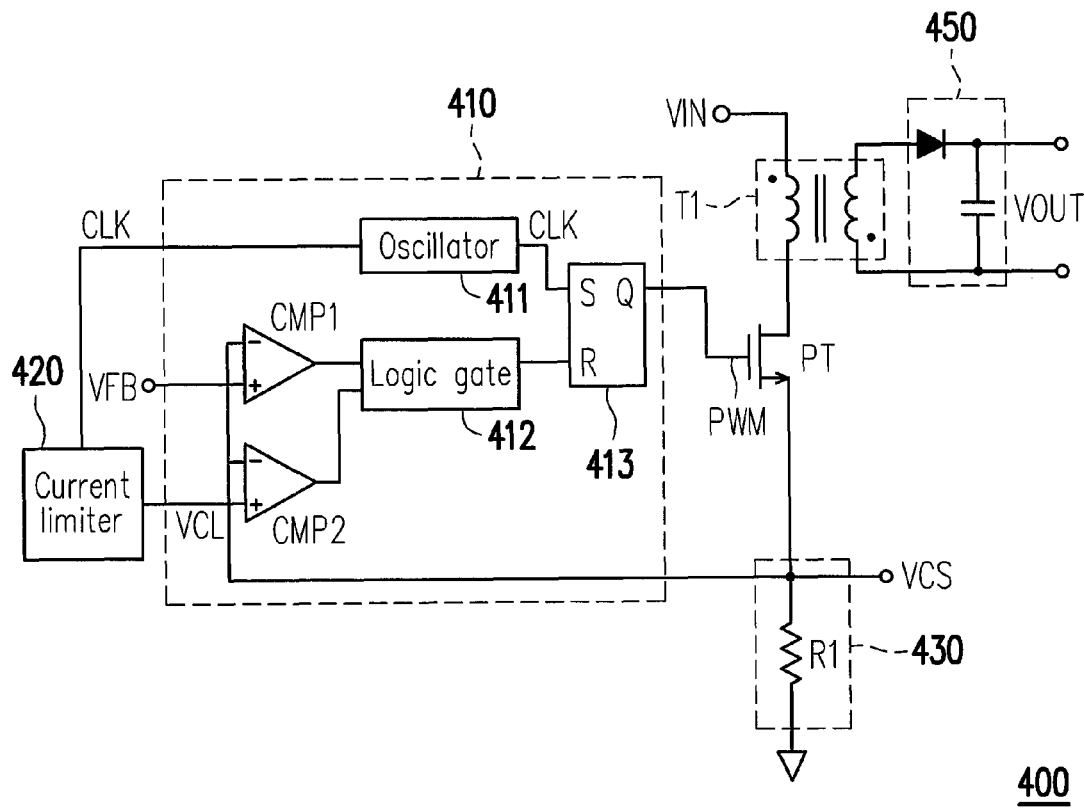
FIG. 4A is a schematic diagram of a fly-back power converting apparatus 400 according to another embodiment of the invention.

FIG. 4A is a schematic diagram of a fly-back power converting apparatus 400 according to another embodiment of the invention. The fly-back power converting apparatus 400 includes a transformer T1, a power transistor PT, a PWM signal generator 410, a current limiter 420, a current detector 430 and a rectifier 450. In the present embodiment, the PWM signal generator 410 includes an oscillator 411, comparators CMP1 and CMP2, a logic gate 412 and an SR latch 413. The comparators CMP1 and CMP2 receive the detecting voltage VCS, and respectively compare the detecting voltage VCS with a feedback voltage VFB and the standard voltage VCL. The logic gate 412 receives outputs of the comparators CMP1 and CMP2 to perform a logic operation, and in the present embodiment, the logic gate 412 can be an OR gate.

The SR latch 413 has a reset terminal R, a setting terminal S and an output terminal Q. The reset terminal R of the SR latch 413 is coupled to an output terminal of the logic gate 412, the setting terminal of the SR latch 413 is coupled to the oscillator 411 for receiving the clock signal CLK, and the output terminal Q of the SR latch 413 generates the PWM signal PWM.

Figure 4B:
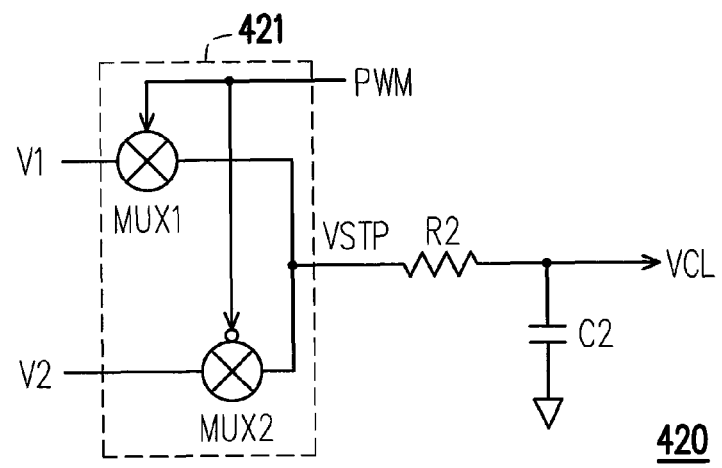
FIG. 4B is a schematic diagram of a current limiter 420 according to an embodiment of the invention.

Referring to FIG. 4B, FIG. 4B is a schematic diagram of the current limiter 420 according to an embodiment of the invention. The current limiter 420 includes a step signal generator 421, a resistor R2 and a capacitor C2. The step signal generator 421 receives the PWM signal PWM and generates a step signal VSTP transited between a first voltage V1 and a second voltage V2 according to the PWM signal PWM. For example, when the first voltage V1 is greater than the second voltage V2, and the PWM signal PWM has a logic high level, the step signal VSTP is equal to the first voltage V1, comparatively, when the PWM signal PWM is transited to a logic low level, the step signal VSTP is correspondingly transited to the second voltage V2.

One terminal of the resistor R2 receives the step signal VSTP, and another terminal thereof generates the standard voltage VCL. The capacitor C2 is coupled in series between the terminal of the resistor R2 that generates the standard voltage VCL and the reference ground voltage GND. Based on a delay effect of the resistor R2 and the capacitor C2, when the PWM signal PWM is transited from the logic low level to the logic high level, the standard voltage VCL is gradually increased from the second voltage V2 to the first voltage V1. An increasing rate of the standard voltage VCL is determined according to a multiplication of the values of the resistor R2 and the capacitor C2.

The step signal generator 421 includes multipliers MUX1 and MUX2, where the multiplier MUX1 performs a multiplication operation by using the first voltage V1 and the PWM signal PWM, and the multiplier MUX1 performs a multiplication operation by using the second voltage V2 and an inverted signal of the PWM signal PWM.

Figure 4C:
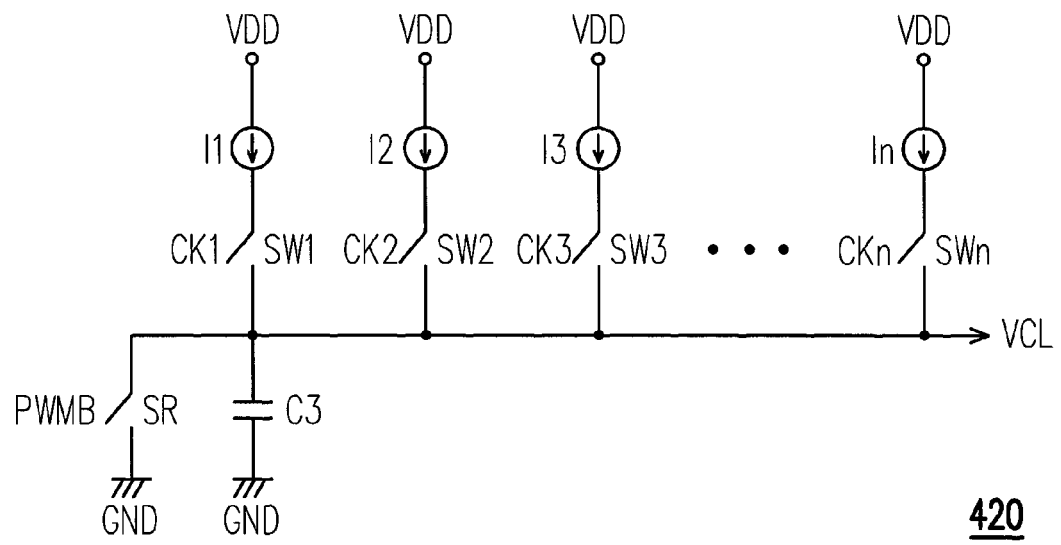
FIG. 4C is a schematic diagram of a current limiter 420 according to another embodiment of the invention.

Referring to FIG. 4C, FIG. 4C is a schematic diagram of the current limiter 420 according to another embodiment of the invention. The current limiter 420 includes current sources I1-In, current switches SW1-SWn, a reset switch SR and a capacitor C3. First terminals of the current sources I1-In commonly receive an operating voltage VDD. The current switches SW1-SWn are respectively coupled in series between second terminals of the current sources I1-In and an output terminal of the current limiter 420. The current switches SW1-SWn are respectively turned on or turned off under control of a plurality of control signals CK1-CKn. The reset switch SR is coupled in series between the output terminal of the current limiter 420 and the reference ground voltage GND, and is turned on or turned off under control of a reset signal (an inverted signal PWMB of the PWM signal PWM). The capacitor C3 is coupled in series between the output terminal of the current limiter 420 and the reference ground voltage. The output terminal of the current limiter 420 generates the standard voltage VCL.

Figure 4D:
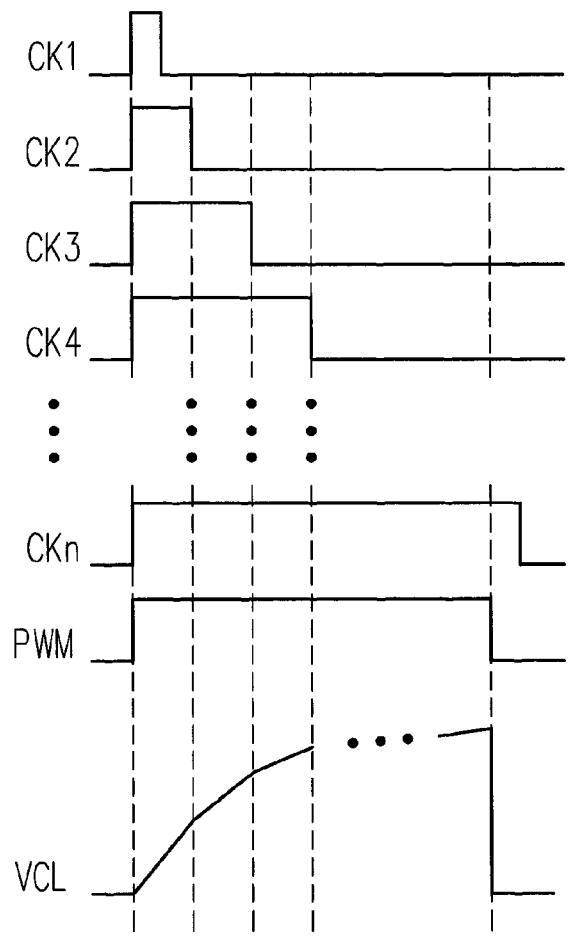
FIG. 4D is an operation waveform diagram of the embodiment of FIG. 4C.

Referring to FIG. 4D for an operation method of the current limiter 420, and FIG. 4D is an operation waveform diagram of the embodiment of FIG. 4C. In the present embodiment, a magnitude of a current flowing through the capacitor C3 is changed by changing the number of turned on current switches SW1-SWn, so as to change an increasing slope of the standard voltage VCL. Initially, the current switches SW1-SWn are all turned on such that the standard voltage VCL is increased in a maximum slope. Then, as time increases, the current switches are turned off one-by-one, such that the increasing slope of the standard voltage VCL is decreased. In this way, the current limiter 420 can effectively generate the segmental linear standard voltage VCL.

Finally, when the PWM signal PWM is in the logic low level, the reset switch SR can be turned on to discharge the capacitor C3, such that the standard voltage VCL is decreased to the reference ground voltage GND.

In summary, a standard voltage varied according to the turn-on time of the power transistor is provided, and the PWM signal generator determines whether or not to limit the current according to the standard voltage varied according to the turn-on time of the power transistor. In this way, the output power of the fly-back power converting apparatus can be stably controlled, so as to avoid the phenomenon of excessive output power generated due to circuit delay.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A fly-back power converting apparatus, operated in a discontinuous conduction mode (DCM) or a boundary conduction mode (BCM), and comprising:
    a power transistor, having a first terminal, a second terminal and a control terminal, wherein the first terminal being coupled to an input voltage, and the control terminal receiving a pulse width modulation (PWM) signal;
    a current detector, coupled in series between the second terminal of the power transistor and a reference ground voltage, and detecting a current output from the second terminal of the power transistor and generating a detecting voltage according to the current;
    a PWM signal generator, coupled to the current detector and the power transistor, and generating the PWM signal according to a comparing result by comparing the detecting voltage and a standard voltage; and
    a current limiter, coupled to the PWM signal generator, and generating the standard voltage according to a turn-on time of the power transistor,
    wherein the current limiter sets a plurality of time points and a plurality of standard voltages corresponding to the time points.

2. The fly-back power converting apparatus as claimed in claim 1, wherein the current limiter receives a clock signal, wherein the turn-on time is obtained according to the clock signal.

3. The fly-back power converting apparatus as claimed in claim 2, wherein a magnitude of the standard voltage provided by the current limiter increases as the turn-on time increases.

4. The fly-back power converting apparatus as claimed in claim 1, wherein the current limiter finds the turn-on time and two adjacent time points in the time points adjacent to the turn-on time, and the current limiter calculates the standard voltage according to the adjacent time points, the standard voltages corresponding to the adjacent time points and the turn-on time.

5. The fly-back power converting apparatus as claimed in claim 1, wherein the current limiter obtains the standard voltage according to a delay time of the PWM signal generator, a threshold value and the turn-on time, wherein the threshold value is set according to a maximum current allowed to be generated by the power transistor.

6. The fly-back power converting apparatus as claimed in claim 5, wherein the current limiter performs an arithmetic operation on the threshold value and the delay time to obtain the standard voltage.

7. The fly-back power converting apparatus as claimed in claim 5, wherein the standard voltage $$VCL = VPK * \frac{t}{t+td},$$

VPK is the threshold value, t is the turn-on time, and td is the delay time.

8. The fly-back power converting apparatus as claimed in claim 1, further comprising:
a transformer, having a first side winding coupled to a path of the power transistor used for receiving the input voltage; and
a rectifier, coupled to a second side winding of the transformer, and generating an output voltage.

9. The fly-back power converting apparatus as claimed in claim 8, wherein the rectifier comprises:
a diode, having an anode coupled to the second side winding of the transformer; and
a capacitor, having a first terminal coupled to a cathode of the diode, and a second terminal coupled to the reference ground voltage.

10. The fly-back power converting apparatus as claimed in claim 1, wherein the current detector comprises:
a resistor, coupled in series between the second terminal of the power transistor and the reference ground voltage.

11. The fly-back power converting apparatus as claimed in claim 1, wherein the current limiter comprises:
a step signal generator, receiving the PWM signal, and generating a step signal transited between a first voltage and a second voltage according to the PWM signal;
a resistor, having a terminal receiving the step signal, and another terminal generating the standard voltage; and
a capacitor, coupled in serried between the terminal of the resistor that generates the standard voltage and the reference ground voltage.

12. The fly-back power converting apparatus as claimed in claim 11, wherein the step signal generator comprises:
a first multiplier, performing a multiplication operation on the first voltage and the PWM signal; and
a second multiplier, having an output terminal coupled to an output terminal of the first multiplier, and performing a multiplication operation on the second voltage and an inverted signal of the PWM signal,
wherein multiplication results of the first multiplier and the second multiplier are added at a node connecting the first and the second multipliers, so as to generate the step signal.

13. The fly-back power converting apparatus as claimed in claim 1, wherein the current limiter comprises:
a plurality of current sources, having first terminals commonly receiving an operating voltage;
a plurality of current switches, respectively coupled in series between second terminals of the current sources and an output terminal of the current limiter, and respectively turned on or turned off under control of a plurality of control signals;
a reset switch, coupled in series between the output terminal of the current limiter and a reference ground voltage, and turned on or turned off under control of a reset signal; and
a capacitor, coupled in series between the output terminal of the current limiter and the reference ground voltage,
wherein the output terminal of the current limiter generates the standard voltage.

* * * * *